May 26, 1953  E. C. DILL ET AL  2,640,151
BLOCKING OSCILLATOR SYSTEM
Filed July 14, 1949
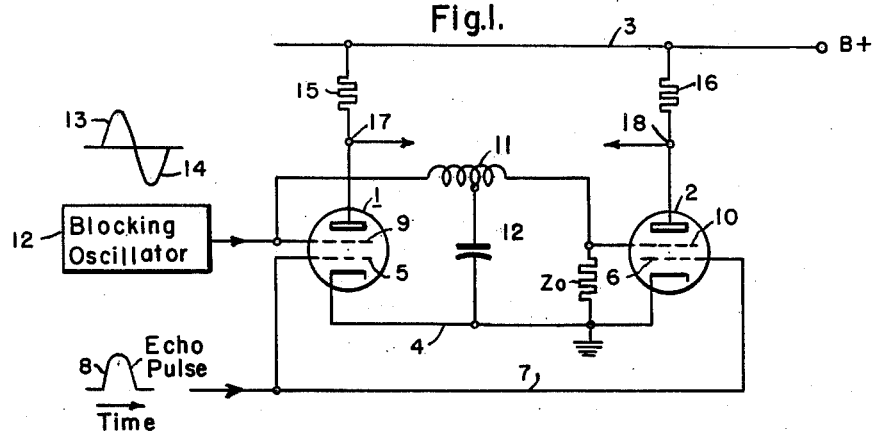
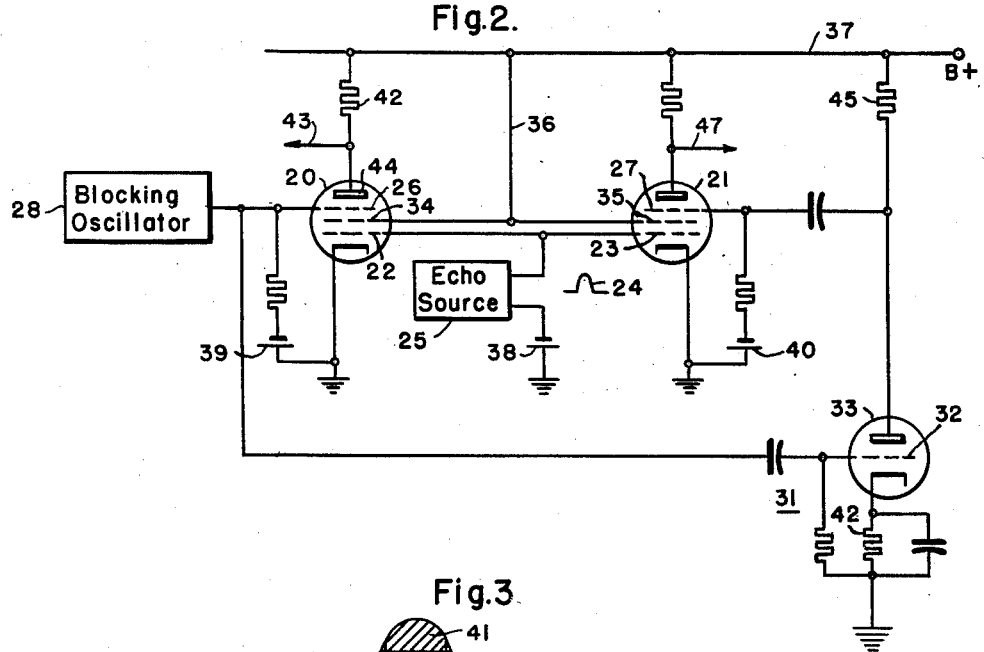
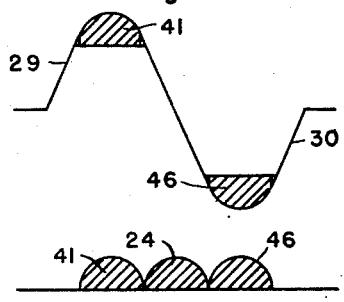
WITNESSES:
E. A. McCloskey
Leon M. Garman
INVENTORS
Everett C. Dill and
Lyttleton W. Ballard.
BY F. E. Browder
ATTORNEY Patented May 26, 1953

2,640,151

UNITED STATES PATENT OFFICE 2,640,151

BLOCKING OSCILLATOR SYSTEM

Everett C. Dill, Arlington, S. Dak., and Lyttleton W. Ballard, Ilchester, Md., assignors to Westinghouse Electric Corporation, East Pittsburgh, Pa., a corporation of Pennsylvania Application July 14, 1949, Serial No. 104,706

1 Claim. (Cl. 250—27)

The present invention relates generally to pulse time discriminator circuits, and particularly to systems for generating the early and late gates of pulse time discriminator circuits.

In automatic control of radar ranging units, where it is necessary automatically to track a moving target, a system employing early and late gates is conventionally employed. The early and late gates, which constitute positive pulses, are fed to a time discriminating circuit capable of indicating the sense and magnitude of the time difference between the received echo from a target, and the early and late gates, respectively.

In such a system, it is customary to establish a correspondence between the times of occurrence of the early and the late gates and the range indicated by the automatic tracking device, and by use of the received echo to force the early and late gates to be moved so they occur in a definite time relationship with respect to the returned echo, and in particular so that they occur in a time relationship straddling the returned echo. Detailed description of one well known and commonly used system employing early and late gates in connection with radar tracking units may be found in the Proceedings of the Institute of Radio Engineers for 1947, at pages 1046 and 1047. The system disclosed in the I. R. E. article for producing the early and late gates is to employ a blocking oscillator associated with a delay line. In such a system, the blocking oscillator pulse is utilized to produce the early gate, the pulse being concurrently applied to the delay line, and the pulse, as it emerges from the remote end of the delay line, forms the late gate.

In accordance with the present invention, a method is disclosed of deriving early and late gates from a blocking oscillator without requiring use of a delay line, and, briefly described, by utilizing a portion of the positive or initial pulse of a blocking oscillator as an early gate, and applying the output of the blocking oscillator to a phase reversing tube to obtain a further positive pulse corresponding in time with a portion of the negative half wave of output of the blocking oscillator, for use as the late gate.

The advantage of systems arranged in accordance with the present invention resides in the formation of the early and late gates without the use of a delay line. Despite the fact that another tube is required in place of the delay line, it is found that the system incorporating one polarity reversing tube, and dispensing with the delay line, is more economical to fabricate, equally positive in operation, and further, advantageous in that circuits so arranged require less space and weight than do circuits employing delay lines.

It is, accordingly, an object of the present invention to provide a system of generating late and early gates for use in radar tracking in response, respectively, to positive and negative output pulses of a blocking oscillator.

It is a further object of the present invention to provide a system for generating early and late gates without utilizing delay lines.

It is a broad object of the present invention to provide a system for generating early and late gates which shall require less space and weight, and which shall be more economical to fabricate, than systems having this purpose which are known to the prior art.

The above and still further objects and advantages and features of the present invention will become apparent upon consideration of a detailed specific embodiment of the invention as described in the following specification and illustrated in the accompanying drawings, wherein:

Figure 1 represents a schematic circuit diagram of an early and late gate forming circuit incorporated in a pulse time discriminator, and employing a delay line in accordance with the prior art;

Figure 2 represents a schematic circuit diagram of an embodiment of a late and early gate generating circuit arranged in accordance with the present invention, and dispensing with use of a delay line; and Figure 3 illustrates wave forms of signals occurring in the operation of the system of Figure 2.

Referring now more specifically to the drawings, and particularly to Figure 1 thereof, there is illustrated a pulse time discriminator circuit comprising a pair of tetrodes 1 and 2, connected in parallel between a source of positive potential 3 and a ground lead 4, the tetrodes 1 and 2 comprising first control electrodes 5 and 6, respectively, which are tied together by means of a lead 7 to which is applied an input pulse 8, which may be assumed to be derived, in one application of the present invention, from a pulse radar receiver, the pulse 8 representing, then, a returned or echo pulse.

The tetrodes 1 and 2 further comprise a pair of second control electrodes 9 and 10, which are joined together by means of a coil 11, the center point of which is returned to ground via a condenser 12, to form a conventional delay line terminated by Zo. The delay line introduces a fixed delay between the time of application of the pulses 8 to the control electrode 9, and their application to control electrode 10, so that they arrive at the control electrode 10 only after a fixed time interval or delay with respect to their times of arrival at control electrode 9.

The tetrodes 1 and 2 may be so biased that output pulses therefrom represent the sum magnitude of input pulses thereto, while the latter overlap, or so that the early and late gating pulses decrease the bias of the tubes 1 and 2 respectively, sufficiently to enable response pulses decrease the bias of the tubes 1 and 2, being each incapable of producing a response in the absence of a gating wave superimposed on, or acting conjointly with, the echo pulse 8.

For the purpose of forming the early and late gates, the output of a blocking oscillator 12, comprised of a positive wave 13 and a negative wave 14, is applied to the control electrode 9, the latter producing voltage output across its plate resistance 15 only while some portion of the positive wave 13 applied to the control electrode 9 coincides in time with some portion of the echo pulse 8, applied to the control electrode 5. The positive gating wave 13 thereafter traverses the delay line 11, 12, and is applied to the control electrode 10 in a positive direction, the tube 2 passing current in response to coincidence of at least a portion of positive wave 13, when applied to the control electrode 10, with application of at least a portion of an echo pulse 8 to the control electrode 6. Accordingly, if, when a point of the trailing edge of positive pulse 13 coincides in time with the leading edge or portion of the pulse 8, the delay introduced by the delay line is arranged to delay the positive pulse 13 until a corresponding point of its leading edge coincides with the late or trailing edge of the pulse 8, the positive pulses 13, as they arrive and as they leave the delay line 11, 12, correspond with early and late gates, respectively, which may be compared with the times of the pulses 8.

The durations of output pulses in the anode loads 15, 16 of tubes 1 and 2, and hence the durations of voltage pulses at the plate terminals 17 and 18 of the tubes 1 and 2, will then be measures of the overlap of the pulse 8 with the early and late gates, respectively, and these voltages may be utilized, in accordance with known techniques, for automatic tracking purposes, or the like.

Turning now to the system of Figure 2 of the drawings, the circuit employed will be seen to be, in many respects, similar to the known circuit illustrated in Figure 1 of the drawings, pentodes 20 and 21 having control electrodes 22 and 23, to which are applied simultaneously echo pulses 24, which may be derived from the output of an echo source 25, such as a radar receiver, the pentodes 20 and 21 further comprising control electrodes 26 and 27, respectively, to which may be applied, respectively, early and late gating waves.

In accordance with the embodiment of our invention illustrated in Figure 2 of the drawings, the output of a blocking oscillator 28, comprising successive positive and negative pulses 29 and 30 (Figure 3), are applied simultaneously directly to the control electrode 26 of the pentode 20, and via a conventional coupling network 31 to the control eelctrode 32 of the phase reversing triode 33, whence a late gate is applied to the control electrode 27 of pentode 21, in a manner hereinafter described.

The control electrodes 22 and 26 of the pentode 20, and the control electrodes 23 and 27 of the pentode 21, correspond respectively with conventional control grids and suppressor grids of pentodes, in the presently described embodiment of our invention, the screen grids 34 and 35 of the pentodes 20 and 21 being maintained at a fixed potential by connection thereof over the lead 36 to a source of positive B+ potential 37. It will be realized, however, that variations of the specific circuit illustrated may be employed, wherein tube types other than pentodes may be employed, without departing from the true spirit and scope of the invention, as illustrated, and particularly that tetrodes or other multigrid tubes may be utilized in a circuit broadly equivalent to that illustrated in Figure 2 of the accompanying drawing.

The control electrodes 22 and 23 are normally biased beyond cut-off by the bias source 38 and the control electrodes 26 and 27 by the bias sources 39 and 40, respectively, the bias potentials being selected in each case to have values such that the pentodes 20 and 21 do not pass plate current in response to the pulses 24 alone but rather so that only when simultaneous application of a peak of a pulse to either of the control electrodes 26 and 27 occurs in conjunction with simultaneous application of an echo pulse 24 to a corresponding one of the control electrodes 22, 23, does a pulse of plate current occur. Otherwise stated, the pulse 29, when applied to control electrodes 26 of the pentode 20, and the pulse 30 when applied to the control electrode 27 of the pentode 21, after phase reversal in the triode 33, have insufficient magnitude, of themselves, to cause plate current flow in the pentodes 20 and 21, respectively, except when their peak portions are impressed concurrently with an echo pulse 24.

Referring now more particularly to Figure 3 of the drawings, in conjunction with Figure 2, the pentode 20 may be biased so that only the positive peak portion 41 of pulse 29 enables flow of anode current in pentode 20 while peak portion 41 occurs conjointly with an echo pulse 24. In such case, a signal is generated at the anode 44 of pentode 20 corresponding in duration to the overlap time between echo pulse 24 and peak portion 41, the signal being derivable from the lead 43. It will be apparent, then, that by appropriate biasing of the pentode 20, in relation to the amplitude of the positive pulse 29 provided by the blocking oscillator 28, the peak portion 41 only of the pulse 29 may be caused to constitute effectively a gating wave for the pentode 20.

The output of the multivibrator or blocking oscillator 28 is likewise applied, as hereinbefore recited, to the phase reversing triode 33, the latter being biased by means of a cathode resistor 42 to current conducting condition in the absence of applied signal. When the output of the blocking oscillator 28 is applied to the control electrode 32 of the phase reversing triode 33, the positive pulse 29 effects a decrease in voltage at the anode of the triode 33, by virtue of the presence in series with the anode of a load resistor 45, and the pentode 21 being biased beyond cut-off, this drop in voltage results in no change in anode current at the pentode 21. Following the decrease in voltage at the anode of the tube 33 in response to the positive pulse 29, the negative pulse 30 of the voltage wave provided by the blocking oscillator 28 is applied to the control electrode 32 of the triode 33, causing a rise in voltage at the anode of triode 33, by reason of the presence of load resistor 45 in the plate circuit of the triode 33. The pentode 21 is so biased, at its suppressor grid 27, by means of bias source 40, that the pentode 21 is capable of passing current only when the shaded portion 46 of the pulse 30, after polarity reversal, occurs concurrently with some portion of an echo pulse 24, whereupon the pentode 21 passes current in response to such concurrent application of gating wave 46 and echo pulse 24, and its anode potential decreases, a signal thus becoming available at lead 47 which is representative, in respect of duration, of overlap time between echo pulse 24 and that portion 46 of pulse 30 which constitutes the late gate.

The shaded portions 41 and 46 of waves 29 and 30, respectively, then, correspond with early and late gating waves, and may be determined, in respect to their amplitude and relative spacings, by adjustment of the amplitude of the output of the blocking oscillator 28, and of its rate of decrease, and by the selection of suitable bias values for the pentodes 20 and 21. For normal operation of a radar tracking system, the spacing between the gating waves 41 and 46 is adjusted to be substantially equal to the duration of the echo pulses 24. Accordingly, no output signals are derivable over the leads 43 and 47 when the gating waves 41 and 46 precisely straddle the echo pulses 24, and signal output becomes available over leads 43, 47, selectively, in accordance with whether echo pulses 24 overlap in time the early gating waves 41 or the late gating waves 46.

The manner of application of the late and early gating waves in conjunction with the repeated pulses 24, in a radar tracking system, forms no part of the present invention, but is known per se, and, accordingly, description thereof is dispensed with herein.

While we have described our invention as utilizing a blocking oscillator for generating gating waves, it will be realized that other sources of alternating-current signal are available which have the requisite output wave shape, and phase control ability, and that these sources may be employed within the true scope of our invention. Further, while we have employed a polarity reversing tube for generating a positively phase late gate from a negatively phase signal, other expedients exist for this same purpose, which may be employed, if desired.

Further variations and modifications of the invention may be resorted to without departing from the true scope of the invention as defined in the appended claim.

We claim as our invention:

A gate generating system, comprising, a source of signal pulses having positive and negative waves in time succession, said pulses joined by wave portions of relatively slowly varying slope, means for reversing the polarity of one of said waves, a first electron discharge tube, a second electron discharge tube, means responsive to a portion only of one of said waves for controlling bias of said first tube, and means responsive to a portion only of waves provided by said means for reversing polarity for controlling bias of said second tube, a source of echo pulses, and means for applying said echo pulses to said tubes simultaneously.

EVERETT C. DILL.
LYTTLETON W. BALLARD.

References Cited in the file of this patent

UNITED STATES PATENTS

| Number | Name | Date |
| --- | --- | --- |
| 2,408,078 | Labin et al. | Sept. 24, 1946 |
| 2,425,066 | Labin et al. | Aug. 5, 1947 |
| 2,426,225 | Krause | Aug. 26, 1947 |
| 2,468,703 | Hammel | Aug. 26, 1949 |
| 2,484,352 | Miller et al. | Oct. 11, 1949 |
| 2,485,395 | Lord | Oct. 18, 1949 |
| 2,534,237 | Cantora et al. | Dec. 19, 1950 |